(12) United States Patent
Ueno et al.

(10) Patent No.: US 12,488,123 B2
(45) Date of Patent: Dec. 2, 2025

(54) IMAGE CAPTURING APPARATUS CAPABLE OF GUARANTEEING AUTHENTICITY OF DIGITAL IMAGE, MANAGEMENT SYSTEM, CONTROL METHOD, AND STORAGE MEDIUM

(71) Applicant: CANON KABUSHIKI KAISHA, Tokyo (JP)

(72) Inventors: Daiyu Ueno, Kanagawa (JP); Keiichiro Kubo, Saitama (JP); Keisuke Tanaka, Kanagawa (JP); Naohiko Tsuchida, Tokyo (JP); Atsushi Fujita, Tokyo (JP); Minoru Sakaida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 346 days.

(21) Appl. No.: 17/962,396

(22) Filed: Oct. 7, 2022

(65) Prior Publication Data

US 2023/0121095 A1 Apr. 20, 2023

(30) Foreign Application Priority Data

Oct. 18, 2021 (JP) .................................. 2021-170402
Aug. 30, 2022 (JP) .................................. 2022-137220

(51) Int. Cl.
*H04L 29/06* (2006.01)
*G06F 21/60* (2013.01)
(Continued)

(52) U.S. Cl.
CPC ........ *G06F 21/6209* (2013.01); *G06F 21/602* (2013.01); *G06F 21/64* (2013.01); *H04L 9/3236* (2013.01); *H04L 9/50* (2022.05)

(58) Field of Classification Search
CPC .... G06F 21/6209; G06F 21/602; G06F 21/64; H04L 9/50; H04L 9/3236
See application file for complete search history.

(56) References Cited

U.S. PATENT DOCUMENTS 6,557,102 B1 * 4/2003 Wong ..................... G06F 21/608
713/176
7,882,187 B2 * 2/2011 Gammage ............. H04L 51/212
455/445

(Continued)

FOREIGN PATENT DOCUMENTS

JP 2017-204706 11/2017

OTHER PUBLICATIONS

He, Junhui, et al. "JPEG image encryption with improved format compatibility and file size preservation." IEEE Transactions on Multimedia 20.10 (2018): 2645-2658. (Year: 2018).*

*Primary Examiner* — Shawnchoy Rahman
(74) *Attorney, Agent, or Firm* — Venable LLP

(57) ABSTRACT

An image capturing apparatus capable of guaranteeing the authenticity of contents while reducing the calculation load of a hash value of an image file. The image capturing apparatus generates an image file, and performs processing for reducing a file size of the image file. A hash value generation section calculates a hash value by applying a hash function to the processed image file. Reduction processing information indicating a method of reducing the file size is generated, and the image file, the hash value, and the reduction processing information are transmitted in a state associated with each other, to a management system that registers data associated with the image file including the hash value in a blockchain.

9 Claims, 11 Drawing Sheets

(51) Int. Cl.
*G06F 21/62* (2013.01)
*G06F 21/64* (2013.01)
*H04L 9/00* (2022.01)
*H04L 9/32* (2006.01)

(56) References Cited

U.S. PATENT DOCUMENTS

| | | | |
|---|---|---|---|
| 10,361,866 B1* | 7/2019 | McGregor | H04L 9/0637 |
| 2008/0005203 A1* | 1/2008 | Bots | G06F 40/194 |
| 2017/0318258 A1* | 11/2017 | Ooishi | G09G 3/20 |
| 2021/0304445 A1* | 9/2021 | Yoo | G06N 20/00 |

* cited by examiner

IMAGE CAPTURING APPARATUS CAPABLE OF GUARANTEEING AUTHENTICITY OF DIGITAL IMAGE, MANAGEMENT SYSTEM, CONTROL METHOD, AND STORAGE MEDIUM

BACKGROUND OF THE INVENTION

Field of the Invention

The present invention relates to an image capturing apparatus, a management system, a control method, and a storage medium, and more particularly to an image capturing apparatus that has a mechanism for guaranteeing the authenticity of a digital image, a management system, a control method, and a storage medium.

Description of the Related Art

In recent years, information sharing via the Internet and the SNS is increasingly becoming more active, and we are in an age where everyone can view and transmit information. Under such circumstances, a technique for altering a digital image has been further developed, and hence it has become difficult for a user viewing information to confirm the authenticity of viewed contents, and a problem, such as fake news, has become serious. To cope with such a problem, there is an increasing demand for a mechanism that guarantees the authenticity of a digital image (no alteration or tampering).

It is under consideration to use, as the mechanism that guarantees the authenticity of a digital image, a blockchain technique which is widely used in industries, such as a financial service. The blockchain technique can prevent tampering of digital data at low costs in a decentralized fashion.

For example, a management system using the blockchain technique registers a hash value of contents generated by a contents generating apparatus and metadata associated with the contents in a blockchain as the information of the contents. With this, the authenticity of the contents from the time of generation thereof is guaranteed (see e.g. Japanese Laid-Open Patent Publication (Kokai) No. 2017-204706). This makes it possible to acquire the contents which have not been altered since the time of generation thereof, from this management system, and disclose the acquired contents e.g. via the Internet and the SNS.

Here, in the above-mentioned system disclosed in Japanese Laid-Open Patent Publication (Kokai) No. 2017-204706, when registering the information on the contents in the blockchain, the contents generating apparatus is required to calculate a hash value of the contents. However, in a case where the amount of data of contents is large, as in the case of a high-quality image or a moving image, the amount of calculation performed to calculate a hash value is also large. For example, a digital camera product, in general, is not necessarily equipped with a high-speed computer, as in a personal computer and a smartphone. Therefore, if the digital camera product as a contents generating apparatus calculates a hash value, it is envisaged that reduction of the continuous photographing speed in high-speed continuous photographing or reduction of the number of continuously photographable images may be caused by the processing load of this calculation.

SUMMARY OF THE INVENTION

The present invention provides an image capturing apparatus that is capable of guaranteeing the authenticity of contents while reducing the calculation load of a hash value of an image file, a management system, a control method, and a storage medium.

In a first aspect of the present invention, there is provided an image capturing apparatus including at least one processor, and a memory coupled to the at least one processor, the memory having instructions that, when executed by the processor, perform the operations as: a first generation unit configured to generate an image file, a processing unit configured to perform processing for reducing a file size of an image file, a calculation unit configured to calculate a hash value by applying a hash function to a processed image file, a second generation unit configured to generate reduction processing information indicating a method of reducing the file size, and a transmission unit configured to transmit the image file, the hash value, and the reduction processing information, in a state associated with each other, to a management system that registers data concerning the image file including the hash value in a blockchain.

In a second aspect of the present invention, there is provided a management system including at least one processor, and a memory coupled to the at least one processor, the memory having instructions that, when executed by the processor, perform the operations as: a first reception unit configured to receive an image file, a hash value of the image file, and reduction processing information indicating a method of processing performed on the image file when calculating the hash value, for reducing a file size, from an image capturing apparatus, an identification number generation unit configured to generate an identification number for identifying the image file, a management unit configured to manage the hash value, the reduction processing information, and the identification number, in a state associated with each other, a registration unit configured to register the hash value in a block of a blockchain, a second reception unit configured to receive an image file as a target of authenticity determination and an identification number of the image file, from a first communication apparatus, a first acquisition unit configured to acquire a first hash value generated by performing processing for reducing a file size of an image file received from the first communication apparatus, by referring to the reduction processing information associated with the identification number, and applying a hash function to the processed image file, a second acquisition unit configured to acquire a second hash value from a block of a blockchain, which is associated with the identification number received from the first communication apparatus and managed by the management unit, and an authenticity determination unit configured to determine authenticity of the image file by comparing the first and second hash values.

In a third aspect of the present invention, there is provided a method of controlling an image capturing apparatus, including generating an image file, performing processing for reducing a file size of an image file, calculating a hash value by applying a hash function to a processed image file, generating reduction processing information indicating a method of reducing the file size, and transmitting the image file, the hash value, and the reduction processing information, in a state associated with each other, to a management system that registers data associated with the image file including the hash value in a blockchain.

In a fourth aspect of the present invention, there is provided a method of controlling a management system, including receiving an image file, a hash value of the image file, and reduction processing information indicating a method of processing performed on the image file when calculating the hash value, for reducing a file size, from an image capturing apparatus, generating an identification number for identifying the image file, managing the hash value, the reduction processing information, and the identification number, in a state associated with each other, registering the hash value in a block of a blockchain, receiving an image file as a target of authenticity determination and an identification number of the image file from a first communication apparatus, acquiring a first hash value generated by performing processing for reducing a file size of the image file received from the first communication apparatus by referring to the reduction processing information associated with the identification number, and applying a hash function to the processed image file, acquiring a second hash value from a block of a blockchain, which is associated with the identification number received from the first communication apparatus and managed by said managing, and determining authenticity of the image file by comparing the first and second hash values.

According to the present invention, it is possible to guarantee the authenticity of contents while reducing the calculation load of a hash value of an image file.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
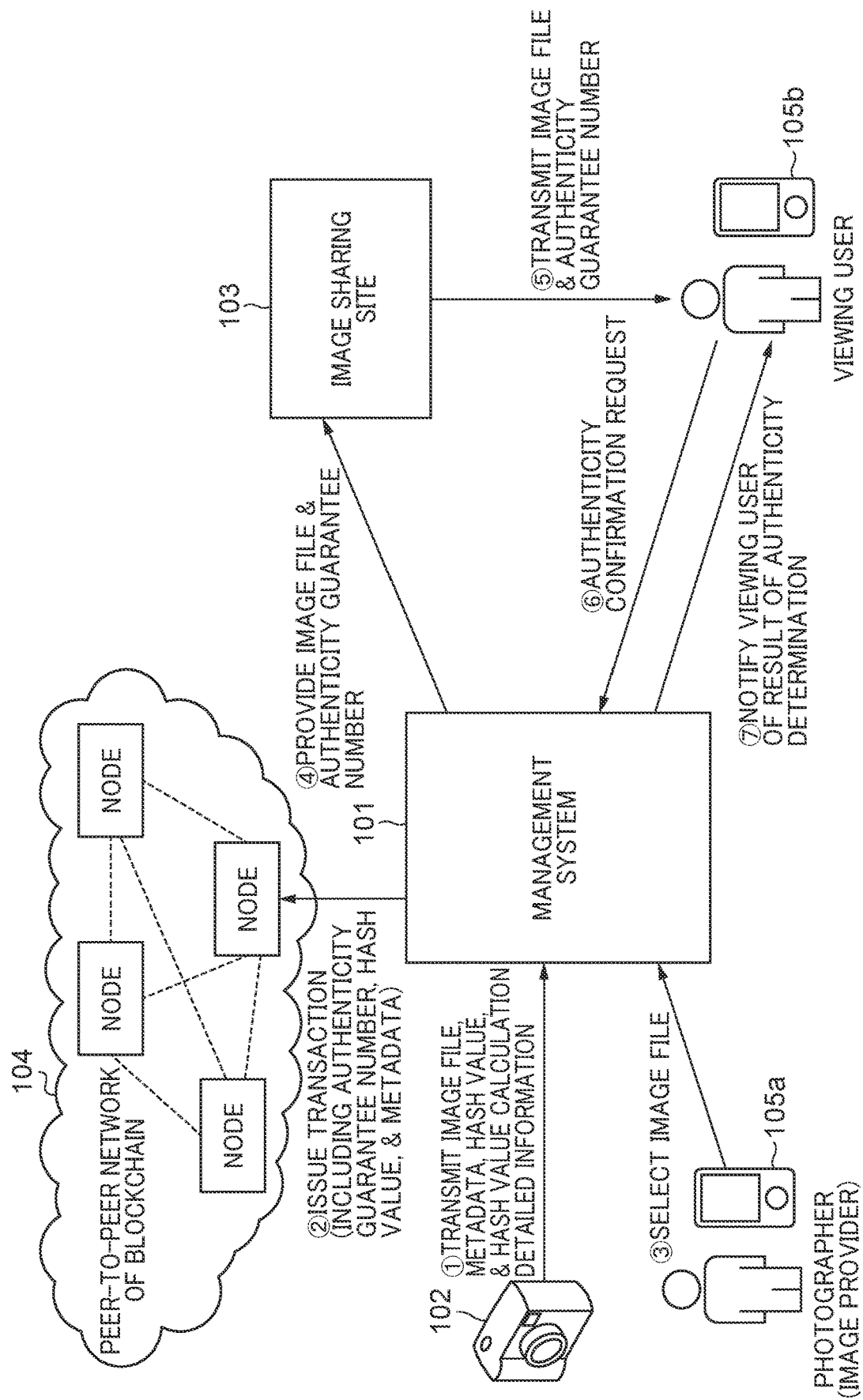
FIG. 1 is a diagram useful in explaining the functions of a management system according to a first embodiment of the present invention.

FIG. 1 is a diagram useful in explaining the functions of a management system 101 according to a first embodiment of the present invention.

The management system 101 has the function of managing contents acquired from an external apparatus, such as an image capturing apparatus 102, via the Internet and the like. The management system 101 is realized by one or more computer apparatuses. Note that although in the present embodiment, a description will be given of a configuration in which the management system 101 further communicates with a peer-to-peer network 104 of a blockchain to use the blockchain, this is not limitative, but the management system 101 may be realized by using any suitable one of other networks.

As shown in FIG. 1, when the image capturing apparatus 102 performs a photographing operation, the image capturing apparatus 102 transmits an image file obtained through this photographing operation, a hash value (image hash value), and hash value calculation detailed information to the management system 101, in a state associated with each other (step (1)). The image file includes image data and metadata. Further, the image data is still image data or moving image data. The metadata includes attribute information of the image data, which indicates a photographer of the image data, a photographing time, a photographing place, a model of the image capturing apparatus, settings of the image capturing apparatus at the photographing time, and so forth. The hash value is a value obtained by applying a hash function to the image file in a state at the time of generation thereof.

The hash value calculation detailed information describes, in a case where image data included in an image file is thinned and a hash function is applied to the thinned image data, information indicating how the image data is thinned. Note that as the algorithm of the hash function to be used, only an initially set algorithm may be used, or one of a plurality of algorithms, such as SHA256 and MD5, may be selected. In the latter case, an algorithm used for hash value calculation is also described in the hash value calculation detailed information. For example, the SHA256 is an algorithm in which calculation is repeatedly performed on the image data on a 64 bytes basis from the top of the data to the end of the dame, to thereby generate a hash value of 32 bytes (256 bits). If from the top of the image data, an operation of using 64 bytes for calculation and skipping the next 64 bytes without using them for calculation is repeatedly performed on the entirety of the image data, the calculation amount is reduced to half. The hash value calculation detailed information in this case can be described e.g. as "Algorithm, SHA256, Read, 64, Skip, 64" by using the CSV file format. Further, in a case where the image data is moving image data, the hash function can be applied to every other frame thereof. The hash value calculation detailed information in this case can be described e.g. as "Algorithm, SHA256, SkipFrame, 1," by using the CSV file format. Further, in combination with this, it is possible to thin data in each frame without using all of the data in the frame. The hash value calculation detailed information in this case can be described as "Algorithm, SHA256, SkipFrame, 1, Read, 64, Skip, 64" by using the CSV file format.

Note that the format of the hash value calculation detailed information is not limited to the CSV file format. For example, the hash value calculation detailed information may be described in a file format which is widely used, such as the JSON file format, or may be described in a custom file format.

Note that although in the present embodiment, the description is given of the configuration in which the image capturing apparatus 102 generates a hash value and transmits the generated hash value to the management system 101, this is not limitative, but for example, the management system 101 may generate a hash value based on an image file acquired from the image capturing apparatus 102.

Upon receipt of the image file, the hash value, and the hash value calculation detailed information from the image capturing apparatus 102, the management system 101 according to the present embodiment generates an authenticity guarantee number which is a unique number in the management system 101. The authenticity guarantee number is an identification number for uniquely identifying the image file.

The management system 101 generates transaction data including the metadata, the hash value, the hash value calculation detailed information, and the authenticity guarantee number, and connects a block in which the generated transaction data has been written, to the blockchain. Specifically, the management system 101 issues the generated transaction data to broadcast the transaction data to one or more computers (nodes) participating in the peer-to-peer network 104 of the blockchain (step (2)). With this, the transaction data is temporarily stored in a transaction pool, and when the transaction data is approved by miners, verification is completed. Then, a block in which the transaction data has been written is generated and is added to the end of the blockchain.

After connecting the block in which the transaction data has been written to the blockchain, the management system 101 stores (provides) the image file and the authenticity guarantee number in an image database 407, described hereinafter with reference to FIG. 4, in a state associated with each other.

Then, the management system 101 causes a user (such as a photographer or an image provider) to select an image file to be disclosed on an image sharing site 103, from a plurality of image files registered in the image database 407 (step (3)). Specifically, the user can access a WEB page of the management system 101 from a communication apparatus 105a operated by the user and select the image file to be disclosed on the image sharing site 103 from the WEB page. The management system 101 provides the image file selected by the user and the authenticity guarantee number associated with the selected image file to the image sharing site 103 (step (4)). The management system 101 notifies the communication apparatus 105a that the image file selected by the user in the step (3) has become capable of being disclosed on the image sharing site 103, at the same time.

The image sharing site 103 controls the display on the WEB page thereof such that the authenticity guarantee number provided from the management system 101 together with the image file is displayed, e.g. in the vicinity of the image file. Note that the above-mentioned display position of the authenticity guarantee number is an example, and the authenticity guarantee number is only required to be displayed in a position where a viewing user of the image sharing site 103 can recognize that it is the authenticity guarantee number associated with the image file.

There is a case where a viewing user of the image sharing site 103 desires to confirm that an image file displayed on the WEB page of the image sharing site 103 has not been altered from the time when the image was photographed. In this case, first, the viewing user acquires (downloads) the image file and the authenticity guarantee number associated with this image file from the image sharing site 103, using a communication apparatus 105b (step (5)). Specifically, the viewing user accesses the WEB page of the image sharing site 103 from the communication apparatus 105b, selects an image file disclosed on the WEB page, and instructs download thereof. Upon receipt of this instruction, the image sharing site 103 transmits the selected image file and the authenticity guarantee number to the communication apparatus 105b.

When the download is completed, the communication apparatus 105b (first communication apparatus) transmits a request for confirming the authenticity of the selected image file to the management system 101 together with the acquired image file and authenticity guarantee number (step (6)). In the present embodiment, the authenticity confirmation request is performed by attaching the image file and the authenticity guarantee number, which have been acquired from the image sharing site 103, to an entry form provided by the management system 101, by using the communication apparatus 105b. However, the method of the authenticity confirmation request is not limited to the method used in the present embodiment, but, for example, the authenticity confirmation request may be performed by transmitting an email to which the image file and the authenticity guarantee number are attached, to the management system 101.

When the authenticity confirmation request is transmitted from the communication apparatus 105b, the management system 101 performs determination of the authenticity of the image file of which is the authenticity is requested to be confirmed. Note that although in this example, the authenticity determination is performed when the management system 101 receives the authenticity confirmation request with respect to the image data displayed on the image sharing site 103 from the communication apparatus 105b of the viewing user of the image sharing site 103, this is not limitative. For example, the management system 101 may periodically perform the authenticity determination based on the image database 407. The management system 101 displays a result of the authenticity determination on the WEB page of the management system 101 or notifies the communication apparatus 105b of the result using an email.

Figure 2:
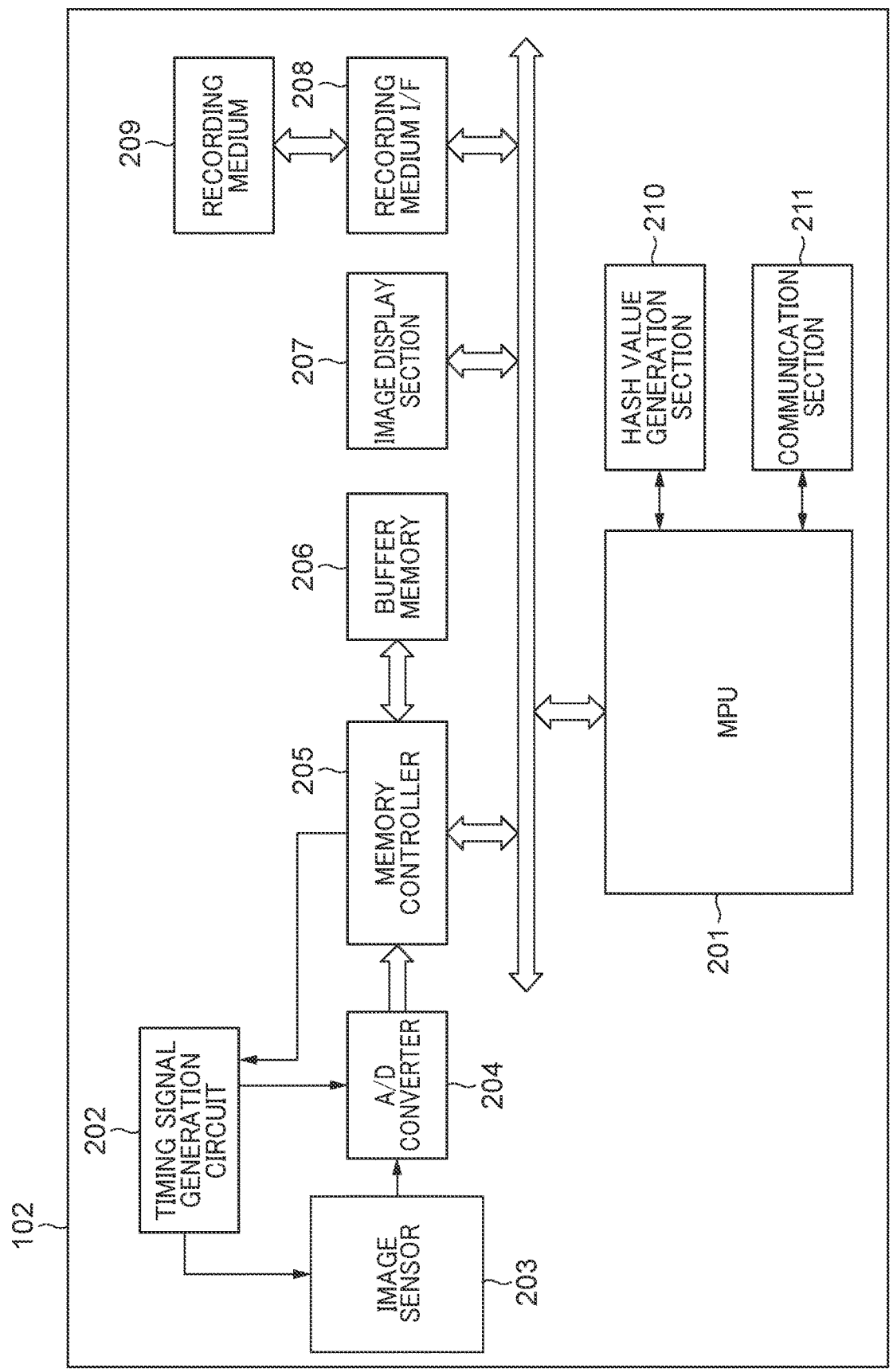
FIG. 2 is a schematic block diagram of an image capturing apparatus appearing in FIG. 1.

FIG. 2 is a schematic block diagram of the image capturing apparatus 102 appearing in FIG. 1. The image capturing apparatus 102 is a camera, such as a digital camera or a digital video camera, or an electronic device equipped with a camera function, such as a mobile phone equipped with the camera function or a computer with a camera.

Referring to FIG. 2, the image capturing apparatus 102 includes an MPU 201, a timing signal generation circuit 202, an image sensor 203, an analog-to-digital converter 204, a memory controller 205, a buffer memory 206, and an image display section 207. Further, the image capturing apparatus 102 includes a recording medium interface 208, a recording medium 209, a hash value generation section 210, and a communication section 211.

The MPU 201 is a micro controller for performing control on the system of the image capturing apparatus 102, such as control of a photographing sequence.

The timing signal generation circuit 202 generates a timing signal necessary for operating the image sensor 203.

The image sensor 203 is a CCD or CMOS sensor that converts light reflected from an object to electrical signals (analog image data) and outputs the electrical signals to the analog-to-digital converter 204.

The analog-to-digital converter 204 converts the analog image data read out from the image sensor 203 to digital image data. This digital image data is hereinafter simply referred to as the "image data".

The memory controller 205 controls reading and writing of an image file from and into the buffer memory 206, a refresh operation of the buffer memory 206, and so forth. This image file is an image file formed by image data generated by the MPU 201 and metadata attached to the generated image data. Details will be described hereinafter.

The buffer memory 206 stores the image file.

The image display section 207 displays the image file stored in the buffer memory 206.

The recording medium interface 208 is for controlling reading and writing of data from and into the recording medium 209.

The recording medium 209 is a storage medium, such as a memory card or a hard disk, and stores programs, image files, and the like.

The hash value generation section 210 (calculation unit) applies a hash function to an image file stored in the buffer memory 206 to generate (calculate) a hash value. Note that not the hash value generation section 210, but the MPU 201 may generate a hash value. Further, the hash value may be generated by applying the hash function not to an image file but to image data.

The communication section 211 is connected to the Internet and transmits and receives data to and from an external apparatus.

Figure 3:
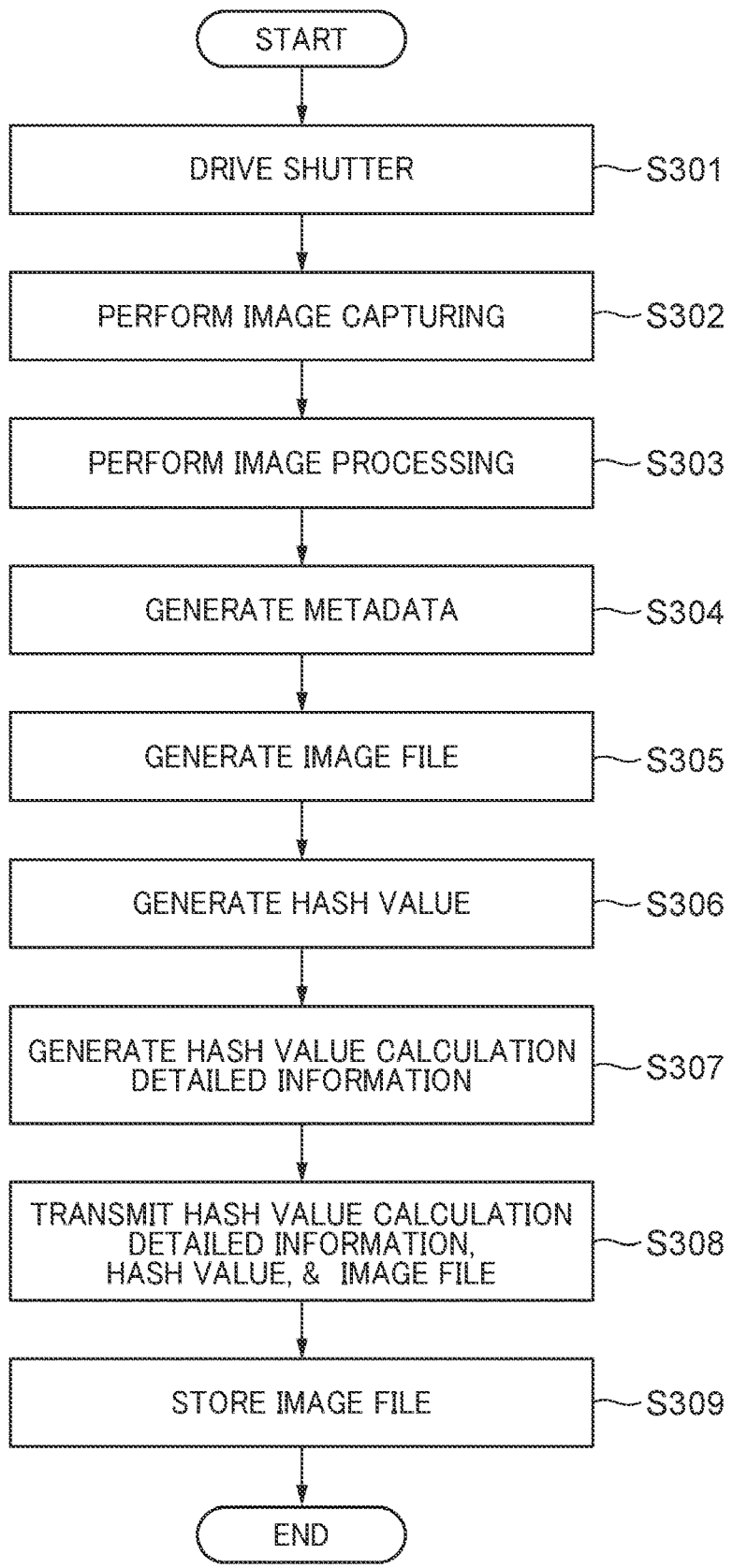
FIG. 3 is a flowchart of a data transmission process performed by the image capturing apparatus appearing in FIG. 1.

FIG. 3 is a flowchart of a data transmission process performed by the image capturing apparatus 102 appearing in FIG. 1. The data transmission process in FIG. 3 is realized by the MPU 201 of the image capturing apparatus 102, which executes a program stored e.g. in the recording medium 209. The data transmission process in FIG. 3 is started when the image capturing apparatus 102 receives a photographing start operation performed by a photographer, such as an operation of pressing a photographing button, not show, of the image capturing apparatus 102.

Referring to FIG. 3, the MPU 201 drives a shutter (not shown) disposed on an object side of the image sensor 203 to control exposure time (step S301).

Then, the MPU 201 performs image capture processing for converting light from an object, received by the image sensor 203 via the shutter, to electrical signals (analog image data) (step S302).

Then, the MPU 201 performs image processing, such as development and encoding, on the electrical signals obtained by the above-mentioned image capture processing (step S303). As a result, image data is generated.

Then, the MPU 201 generates metadata including attribute information (a photographer, a photographing time, a photographing place, a model of the image capturing apparatus, settings of the image capturing apparatus at the photographing time, and so forth) of image data when the image capture processing for generating the image data has been performed (step S304).

Then, the MPU 201 generates an image file in the JPEG format, the MPEG format, or the like, which is formed by adding the generated metadata to the image data (step S305).

Then, the MPU 201 controls the hash value generation section 210 to generate a hash value by applying a hash function to the binary data of the generated image file (step S306).

Further, there is a case where when generating (calculating) a hash value, the hash value is generated by skipping part of the binary data of the image file. In this case, the MPU 201 (generation unit) generates hash value calculation detailed information which records how to skip the part of the binary data of the image file (how to thin data) (step S307).

Then, the MPU 201 (transmission unit) controls the communication section 211 to transmit the hash value and the image file to the management system 101 (step S308). At this time, in a case where the hash value calculation detailed information has been generated in the step S307, the hash value calculation detailed information is also transmitted to the management system 101 together. Note that the data transmitted in the step S308 may be encoded.

The MPU 201 stores the image file in the recording medium 209 (step S309), followed by terminating the present process.

Thus, in the present embodiment, when the image capturing apparatus 102 performs the photographing operation, not only the image file including the image data and the metadata is recorded in the recording medium 209, but also the image file and the hash value are transmitted to the management system 101. Further, in a case where the hash value calculation detailed information has been generated in the step S307, the hash value calculation detailed information is also transmitted to the management system 101.

Figure 4:
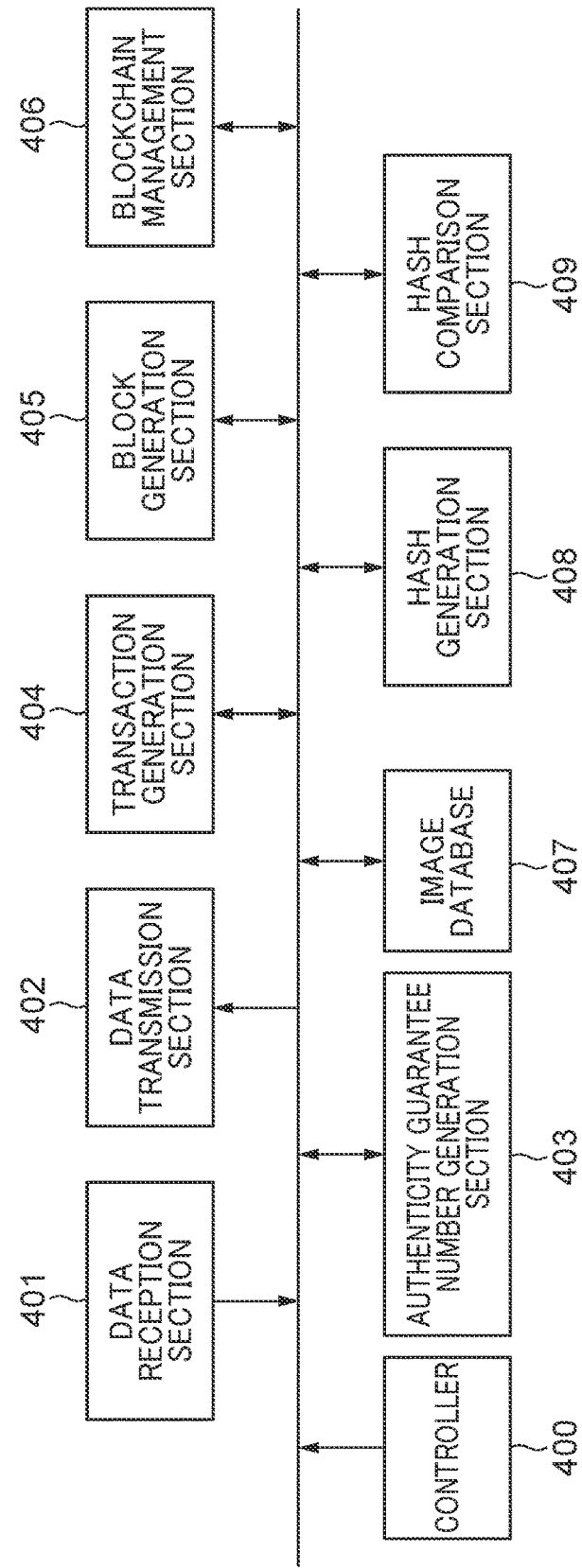
FIG. 4 is a schematic block diagram of the management system appearing in FIG. 1.

FIG. 4 is a schematic block diagram of the management system 101 appearing in FIG. 1. In the present embodiment, the management system 101 is formed by one or a plurality of computers connected to the network.

Referring to FIG. 4, the management system 101 includes a controller 400, a data reception section 401, a data transmission section 402, an authenticity guarantee number generation section 403, and a transaction generation section 404. Further, the management system 101 includes a block generation section 405, a blockchain management section 406, the image database 407, a hash generation section 408, and a hash comparison section 409.

The controller 400 controls the overall operation of the management system 101.

The data reception section 401 receives a variety of data from an external apparatus. For example, the data reception section 401 receives a hash value, hash value calculation detailed information, and an image file, from the image capturing apparatus 102. Further, the data reception section 401 (reception unit) receives an image file and an authenticity guarantee number for performing authenticity determination from the communication apparatus 105b operated by the viewing user of the image sharing site 103.

The data transmission section 402 transmits a variety of data to an external apparatus. For example, the data transmission section 402 transmits an image file selected to be disclosed on the image sharing site 103 and an authenticity guarantee number associated with the selected image file to the communication apparatus 105a operated by a user (such as a photographer or an image provider). Further, the data transmission section 402 transmits a result of the authenticity determination to the communication apparatus 105b operated by the viewing user who has requested confirmation of the authenticity of the image file.

The authenticity guarantee number generation section 403 (identification number generation unit) generates, when receiving a hash value and an image file from the image capturing apparatus 102, an authenticity guarantee number which is a unique number in the management system 101.

The transaction generation section 404 generates transaction data and broadcasts the generated transaction data to one or more computers (nodes) participating in the peer-to-peer network 104 of the blockchain. The transaction data includes a hash value received from the image capturing apparatus 102, an authenticity guarantee number which is generated when the hash value is received and associated with the hash value, and the metadata included in the image file.

When the broadcasted transaction data is approved by miners and the verification is completed, the block generation section 405 generates a block into which the transaction data has been written and connects the generated block to the blockchain.

The blockchain management section 406 (management unit) manages the blockchain which is also held by one or more computers (nodes) participating in the peer-to-peer network 104 of the blockchain. Further, the management system 101 and the nodes are synchronized with each other such that the blockchain held by each of them always has the same contents.

Figure 5:
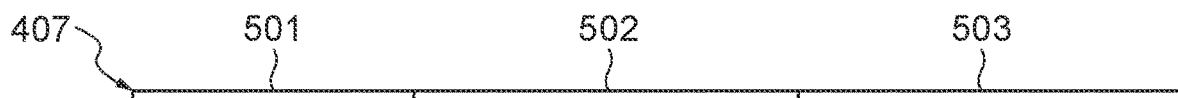
FIG. 5 is a diagram showing the configuration of an image database appearing in FIG. 4.

In the image database 407, an image file and an authenticity guarantee number associated with the image file are registered. Specifically, the image database 407 is formed by block IDs 501, authenticity guarantee numbers 502, and image file names 503, which are associated with one another, as shown in FIG. 5.

As each block ID 501, a block ID number sequentially issued is set whenever a block in which an image file has been written is connected to the blockchain. That is, each block ID 501 is associated with one of hash values registered in the blockchain.

As the authenticity guarantee number 502, an authenticity guarantee number associated with an image file is set.

As the image file name 503, a file name of an image file received by the management system 101 e.g. from the image capturing apparatus 102 is set.

Note that the configuration of the image database 407 is not limited to the above-described one, but the image database 407 may include other items.

Referring again to FIG. 4, the hash generation section 408 applies, when performing the authenticity determination, a hash function to the image file transmitted from the communication apparatus 105b of the user (viewing user) having made the authenticity confirmation request to thereby generate a hash value.

The hash comparison section 409 acquires a block (described hereinafter) associated with the authenticity guarantee number transmitted from the user having made the authenticity confirmation request, from the blockchain managed by the blockchain management section 406. Then, the hash comparison section 409 acquires a hash value (image hash value) written in the acquired block of the blockchain. The hash comparison section 409 performs the authenticity determination by comparing the hash value acquired from the block and the hash value generated by the hash generation section 408. If these two hash values are the same, the hash comparison section 409 determines that the image file transmitted from the user having made the authenticity confirmation request has not been altered from the state at the time of generation thereof (true). On the other hand, if the two hash values are different, the hash comparison section 409 determines that the image file transmitted from the user having made the authenticity confirmation request has been altered from the state at the time of generation thereof (not true/false).

For example, there is a case where an image file distributed from the image sharing site 103 to the communication apparatus 105b has been altered, and the altered image file is transmitted to the management system 101 together with an authenticity confirmation request. In a case where this authenticity confirmation request is received, a hash value generated by the hash generation section 408 by applying the hash function to the received image file is different from a hash value generated from the image file before alteration. Further, in the management system 101, the hash value stored in the blockchain cannot be changed by anyone. Therefore, in a case where the above-mentioned authenticity confirmation request is received, the hash value generated by the hash generation section 408 from the image file does not match a hash value stored in a block of the blockchain, which is associated with the authenticity guarantee number included in the authenticity confirmation request.

Figure 6:
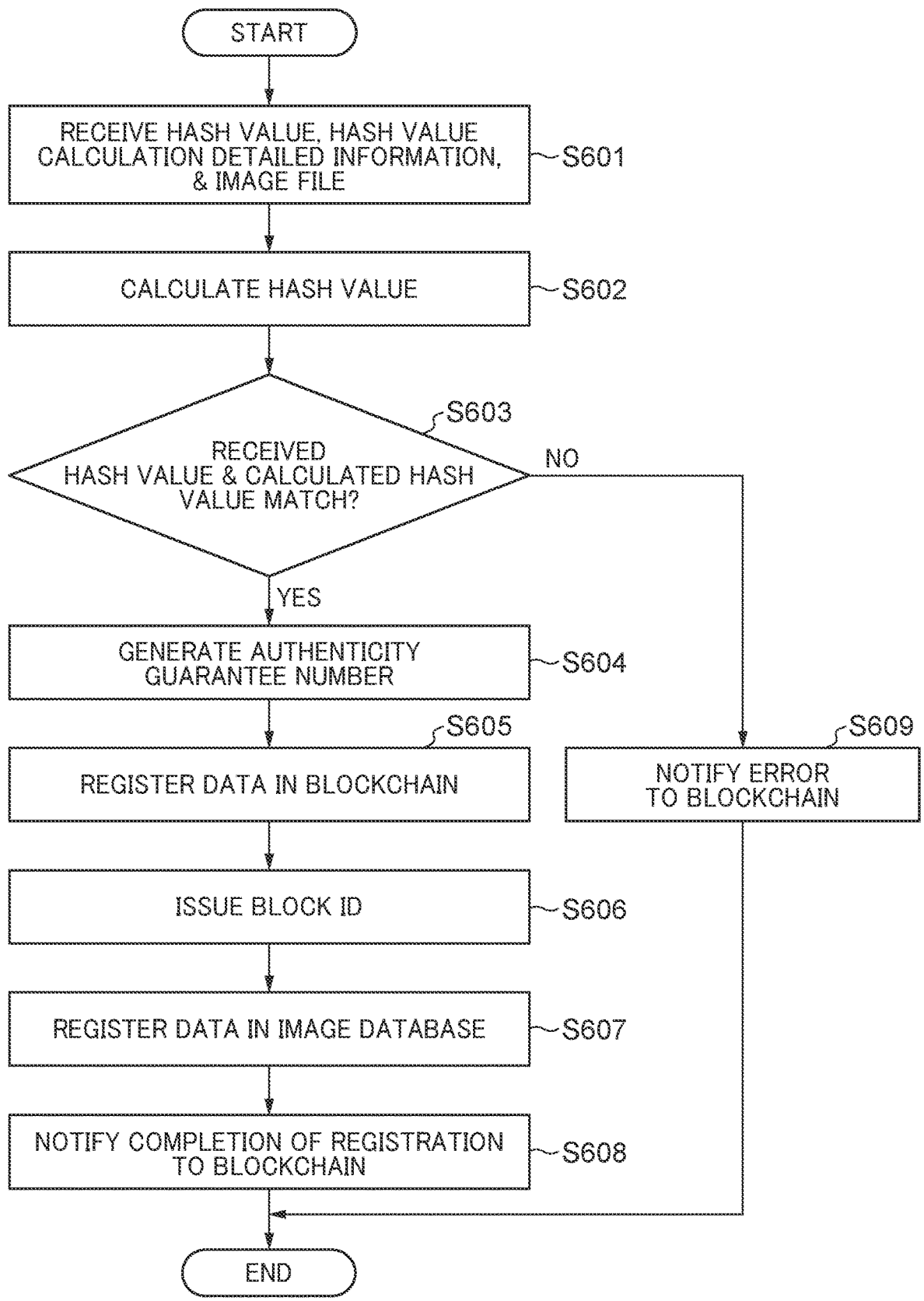
FIG. 6 is a flowchart of a blockchain registration process performed by the management system appearing in FIG. 1.

FIG. 6 is a flowchart of a blockchain registration process performed by the management system 101 appearing in FIG. 1. The blockchain registration process in FIG. 6 is realized by the controller 400 that executes a program stored in a recording medium included in the computer forming the management system 101. The blockchain registration process in FIG. 6 is executed, for example, when the data transmission process in FIG. 3 is performed by the image capturing apparatus 102, and the hash value and the image file are transmitted from the image capturing apparatus 102 by executing the step S308. Here, the description is given of a case where the hash value calculation detailed information is generated in the step S307, and the hash value calculation detailed information is also transmitted to the management system 101 together with the hash value and the image file in the step S308.

Referring to FIG. 6, the controller 400 receives the hash value, the hash value calculation detailed information, and the image file from the image capturing apparatus 102 (step S601). In a case where the received data has been encoded, the controller 400 decodes the received data. After that, the controller 400 stores the hash value, the hash value calculation detailed information, and the metadata included in the received image file in the RAM, not shown.

Then, the controller 400 applies thinning processing based on the hash value calculation detailed information to the image file received in the step S601. Then, the controller 400 calculates a hash value by applying the hash function to the image file after thinning (step S602). Then, the controller 400 determines whether or not the hash value received in the step S601 and the hash value calculated in the step S602 match (step S603).

If it is determined in the step S603 that these hash values match, the process proceeds to a step S604, described hereinafter. If it is determined in the step S603 that these hash values do not match, the process proceeds to a step S609. In the step S609, the controller 400 sends an error notification that the image file cannot be registered in the blockchain. After that, the present process is terminated.

In the step S604, the controller 400 controls the authenticity guarantee number generation section 403 to generate an authenticity guarantee number of the received image file.

Then, the controller 400 registers the authenticity guarantee number generated in the step S604, and the hash value, the hash value calculation detailed information, and the metadata, which are stored in the RAM in the step S601, in the blockchain (step S605). Specifically, first, the transaction generation section 404 generates transaction data including the authenticity guarantee number, the hash value, the hash value calculation detailed information, and the metadata. Next, the transaction generation section 404 broadcasts the transaction data to one or more computers (nodes) participating in the peer-to-peer network 104 of the blockchain. When the broadcasted transaction data is approved by miners and the verification is completed, the block generation section 405 generates a block in which the verified transaction data has been written and connects (registers) the generated block to (in) the blockchain.

Then, the controller 400 issues a block ID associated with the registered block (step S606). In this step, the controller 400 issues a value generated by applying the hash function twice to the header of the block as the block ID. Note that although the block ID is used when referring to the block, no field for the block ID is provided in the block.

Then, the controller 400 registers the issued block ID, the image file received in the step S601, and the authenticity guarantee number generated in the step S604, in the image database 407 in a state associated with each other (step S607). Then, the controller 400 transmits a registration completion notification that the processing for registering the image file in the blockchain is completed to the image capturing apparatus 102 (step S608), followed by terminating the blockchain registration process.

Figure 7:
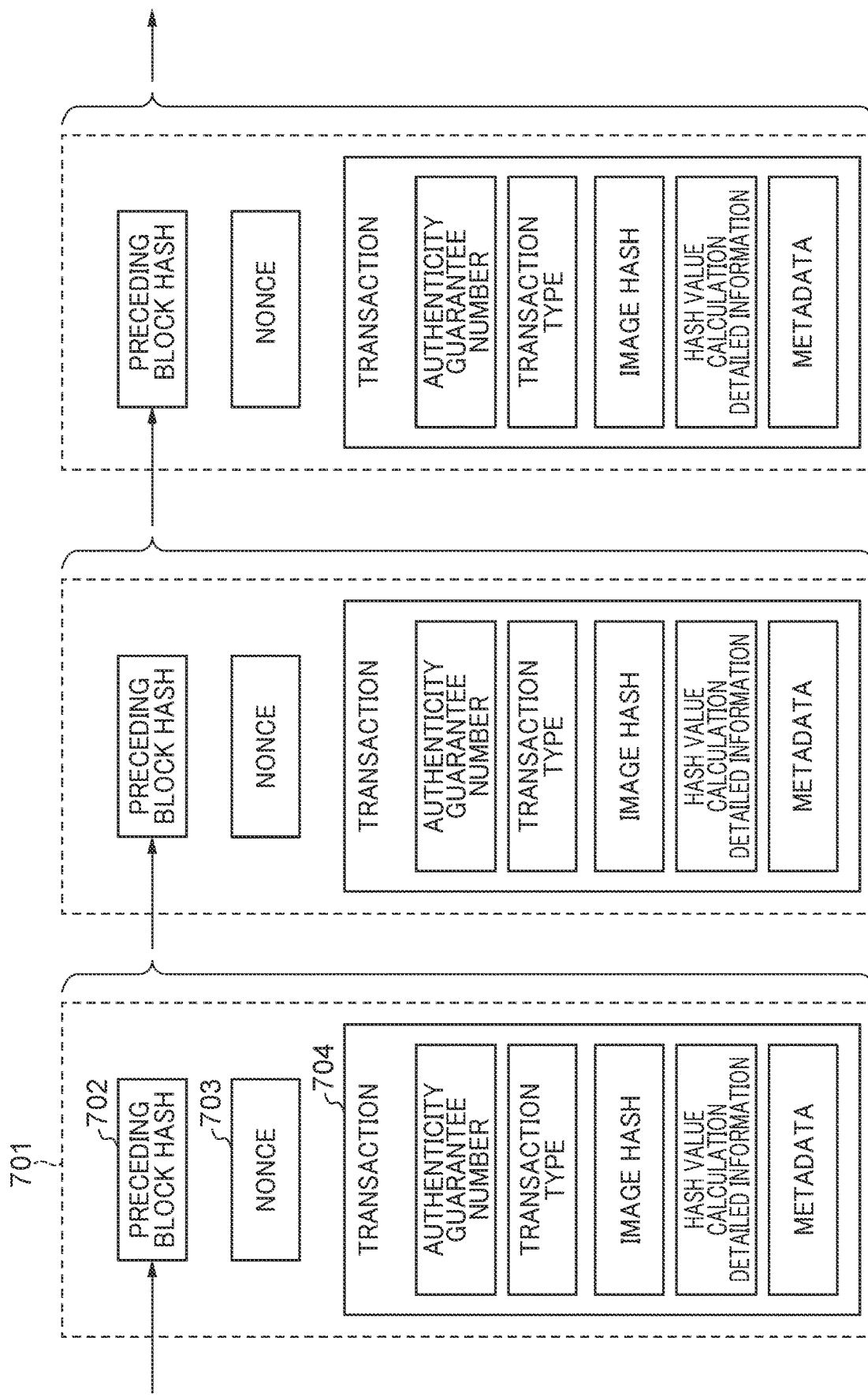
FIG. 7 is a diagram showing an example of a block data structure of a blockchain managed by a blockchain management section appearing in FIG. 4.

FIG. 7 is a diagram showing an example of the block data structure of the blockchain managed by the blockchain management section 406 appearing in FIG. 4. As shown in FIG. 7, the blockchain is a database formed by connecting blocks like a chain along the time series. A block 701 connected to the blockchain includes a preceding block hash 702, a nonce 703, and transaction 704.

The preceding block hash 702 is a hash value of a block connected to the blockchain immediately before the block 701.

The nonce 703 is a nonce value used for mining.

The transaction 704 is the transaction data generated by the transaction generation section 404, and includes a transaction type, an image hash, an authenticity guarantee number, hash value calculation detailed information, and metadata.

The transaction type is information indicating a type of transaction. The internal structure of the transaction is different depending on a transaction type.

The image hash is the hash value transmitted from the image capturing apparatus 102 to the management system 101.

The authenticity guarantee number is the authenticity guarantee number generated by the management system 101 when the image hash is transmitted from the image capturing apparatus 102 to the management system 101.

The hash value calculation detailed information is the hash value calculation detailed information transmitted from the image capturing apparatus 102 to the management system 101.

The metadata is the metadata included in the image file transmitted from the image capturing apparatus 102 to the management system 101.

Figure 8:
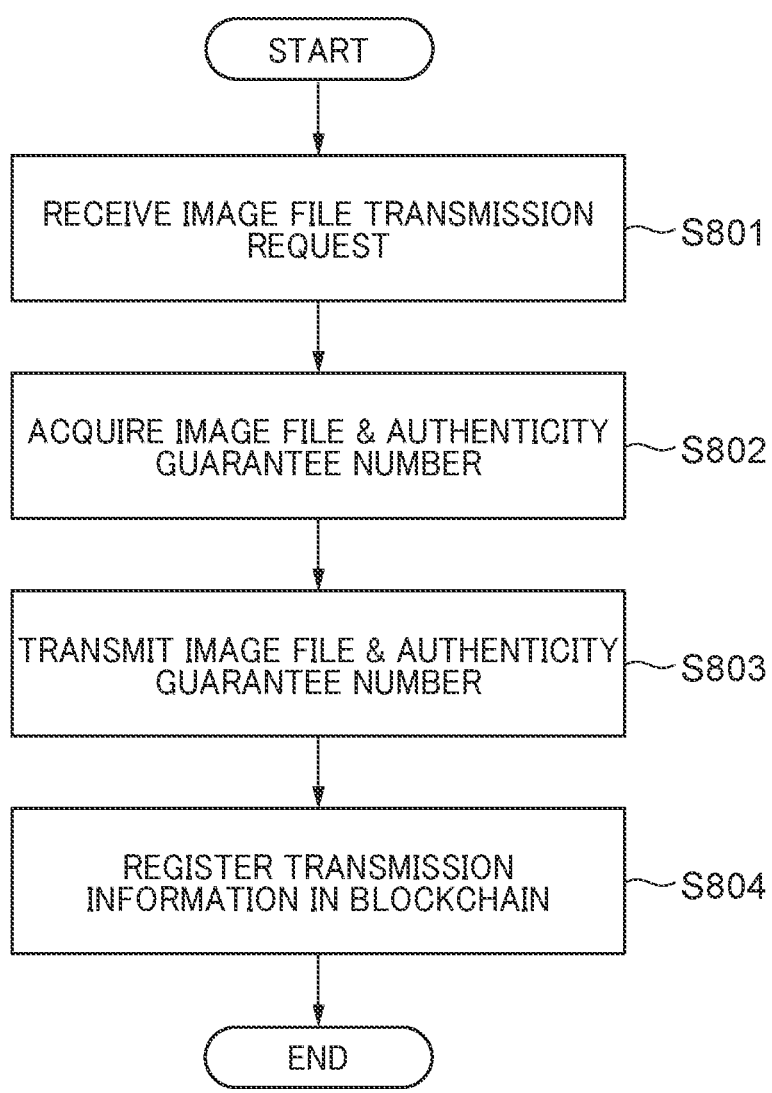
FIG. 8 is a flowchart of an image data transmitting process performed by the management system appearing in FIG. 1, for transmitting image data to an image sharing site.

FIG. 8 is a flowchart of an image file transmission process performed by the management system 101 appearing in FIG. 1, for transmitting the image file to the image sharing site 103. The image file transmission process in FIG. 8 is also realized by the controller 400 that executes a program stored in the recording medium included in the computer forming the management system 101. The image file transmission process in FIG. 8 is executed when the user (such as a photographer) selects one of a plurality of image files registered in the image database 407 and makes a request for transmitting the selected image file to the image sharing site 103 using the communication apparatus 105a. This transmission request includes a block ID associated with the image file selected by the user in the image database 407.

Referring to FIG. 8, first, the controller 400 receives the above-mentioned transmission request from the communication apparatus 105a operated by the user, via the data reception section 401 (step S801).

Then, the controller 400 acquires an image file as the target of the transmission request and the authenticity guarantee number of this image file from the image database 407 (step S802). Specifically, the controller 400 acquires the image file and the authenticity guarantee number, associated with a block ID included in the transmission request, from the image database 407.

Then, the controller 400 controls the data transmission section 402 to transmit the acquired image file and the authenticity guarantee number to the image sharing site 103 (step S803). The controller 400 notifies the communication apparatus 105a of the user as the requesting source of the transmission request that the image file as the target of the transmission request has become capable of being disclosed on the image sharing site 103 at the same time.

Then, the controller 400 registers the transmission information of the image file in the blockchain (step S804). Specifically, first, the transaction generation section 404 generates transaction data including the authenticity guarantee number, the transmission information of the image file, the image data, and information indicating the transmission destination of the authenticity guarantee number (such as a URL). Next, the transaction generation section 404 broadcasts the transaction data to one or more computers (nodes) participating in the peer-to-peer network 104 of the blockchain. When the broadcasted transaction data is approved by miners and the verification is completed, the block generation section 405 generates a block in which the verified transaction data has been written and connects the generated block to the blockchain. After that, the image file transmission process is terminated.

As described above, in the image file transmission process in FIG. 8, when an image file is transmitted from the management system 101 to the image sharing site 103 in response to a transmission request from a user, the management system 101 notifies the user that the image file has become capable of being disclosed on the image sharing site 103. The transmission information of the image file is registered in the blockchain at the same time. This enables the user to grasp a use status of the image file.

Figure 9:
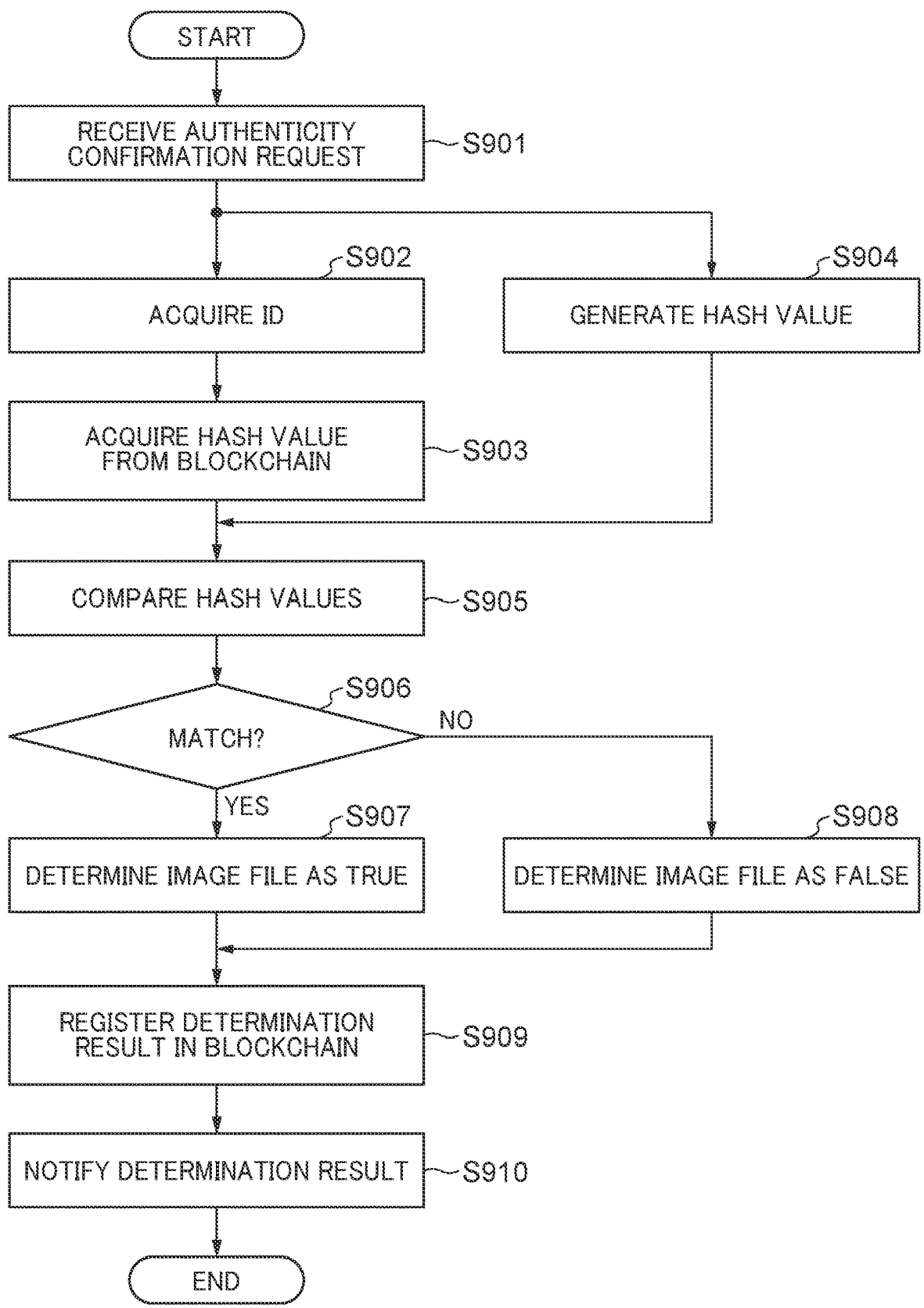
FIG. 9 is a flowchart of an authenticity determination process performed by the management system appearing in FIG. 1.

FIG. 9 is a flowchart of an authenticity determination process performed by the management system 101 appearing in FIG. 1. The authenticity determination process in FIG. 9 is also realized by the controller 400 that executes a program stored in the recording medium included in the computer forming the management system 101. Note that although in this example, the authenticity determination process in FIG. 9 is executed when a viewing user of the image sharing site 103 makes a request for confirming the authenticity of an image file displayed on the image sharing site 103 to the management system 101 by operating the communication apparatus 105b, this is not limitative.

Referring to FIG. 9, the controller 400 receives an authenticity confirmation request from the communication apparatus 105b operated by the viewing user, via the data reception section 401 (step S901). When receiving this request, the controller 400 also receives an image file as the target of the authenticity determination and an authenticity guarantee number associated with this image file, via the data reception section 401.

Then, the controller 400 inquires the image database 407 by using the authenticity guarantee number received in the step S901 as a key and thereby acquires a block ID associated with this authenticity guarantee number (step S902).

Then, the controller 400 (second acquisition unit) accesses a block corresponding to the acquired block ID in the blockchain and acquires a hash value (image hash value: second hash value) stored in this block (step S903).

Further, in parallel with the steps S902 and S903, the controller 400 controls the hash generation section 408 (hash value generation unit) to apply the hash function to the image file received in the step S901 (step S904). With this, the controller 400 (first acquisition unit) generates (acquires) a hash value (first hash value) by the hash generation section 408. In doing this, the controller 400 accesses a block corresponding to the acquired block ID of the plurality of blocks forming the blockchain and acquires the hash value calculation detailed information stored in this block. In the step S904, by referring to this hash value calculation detailed information, the hash value is generated by executing thinning processing on the image file and applying the hash function to the thinned image file.

When the steps S902 to S904 are completed, the controller 400 controls the hash comparison section 409 to compare the image hash value acquired in the step S903 and the hash value generated in the step S904 (step S905).

The controller 400 determines whether or not the two hash values compared in the step S905 match (step S906).

If it is determined in the step S906 that the two hash values match, the controller 400 (authenticity determination unit) determines the image file as "true" indicating that the image file received in the step S901 has not been altered from the state at the time of generation thereof (step S907). After that, the process proceeds to a step S909.

On the other hand, if it is determined in the step S906 that the two hash values do not match, the controller 400 determines the image file as "false" indicating that the image file received in the step S901 has been altered from the state at the time of generation thereof (step S908), and the process proceeds to the step S909.

Then, the controller 400 controls the block generation section 405 to register the result of the determination in the step S907 or S908 in the blockchain (step S909). Specifically, the block generation section 405 generates a block in which the result of the determination in the step S907 or S908 has been written and connects the generated block to the blockchain.

Then, the controller 400 controls the data transmission section 402 to notify the communication apparatus 105b as the requesting source of the authenticity confirmation request of the determination result (step S910), followed by terminating the present process.

As described above, according to the present embodiment, the following process is executed in the management system 101: First, upon receipt of an image file and a hash value generated at the time of generation of the image file, an authenticity guarantee number for identifying the received image file is generated, and the received hash value is registered in the blockchain in a state associated with the authenticity guarantee number. Then, upon receipt of an authenticity confirmation request from a viewing user, a hash value generated based on the image file received together with the authenticity confirmation request and the hash value registered in the blockchain, which is associated with the authenticity guarantee number received together with the authenticity confirmation request, are compared. With this, in the management system 101, it is possible to easily determine the authenticity of the image file acquired by the viewing user.

Further, in the present embodiment, the image file received by the management system 101 together with the hash value from the image capturing apparatus 102 includes still image data or moving image data. That is, in the present embodiment, it is possible to easily determine the authenticity of the still image data or moving image data registered in the management system 101. Further, when applying the hash function to an image file, the image capturing apparatus 102 applies the hash function to the image data (binary data) included in the image file by thinning the image data (for example, in a case where the image data is moving image data, the hash function is applied to every other frame). This reduces the calculation load. Further, the information on this thinning processing (information indicating how to skip binary data of the image file) is associated with the blockchain as the hash value calculation detailed information and is never altered, and hence the accuracy of the determination performed when executing the authenticity determination process on the image file is increased.

Note that the method of thinning frames used in a case where the image data is moving image data is not limited to a method of skipping every other frame, but may be method of skipping every plurality of frames. For example, desired frames may be skipped or a frame may be skipped at desired frame intervals. Further, the information indicating the method of skipping frames is only required to be stored in the hash value calculation detailed information. Further, as for frames which are not skipped and left, thinning may be performed on a frame-by-frame basis, and the information indicating this method of thinning the moving image data may be also stored in the hash value calculation detailed information.

In the present embodiment, the management system 101 may be formed by at least a first computer that generates an authenticity guarantee number of an image file and a second computer that registers a hash value generated when the image file is generated in the blockchain in a state associated with the authenticity guarantee number.

Further, in the present embodiment, the management system 101 is formed by at least a plurality of computers (nodes) that register a hash value generated when the image file is generated, in the blockchain, in a state associated with the authenticity guarantee number. With this, in the configuration in which registration in the blockchain is performed by the plurality of computers, it is possible to easily determine the authenticity of the image file using the plurality of computers.

Further, in the present embodiment, in the management system 101, upon receipt of a request for transmitting an image file from the communication apparatus 105a of the user (image provider), the image file and the authenticity guarantee number of the image file are acquired from the image database 407 and transmitted to the image sharing site 103. Further, on the image sharing site 103, the authenticity guarantee number provided from the management system 101 together with the image file is displayed on the WEB page e.g. near the image file. With this, the user (image provider) can provide the authenticity guarantee number to a viewing user together with the image file, via the image sharing site 103. Further, in a case where the viewing user desires to confirm the authenticity of the image file on the image sharing site 103, the viewing user is only required to operate the communication apparatus 105b and transmit the image file and the authenticity guarantee number, which are acquired from the image sharing site 103, to the management system 101 together with an authenticity confirmation request. With this, a result of the determination of whether the image file is "true" or "false" is notified from the management system 101 to the communication apparatus 105b, and hence the viewing user can easily determine the authenticity of this image file.

In the present embodiment, the management system 101 includes the hash generation section 408. With this, the management system 101 can determine, based on an image file transmitted from a user, the authenticity of the image file without forcing the communication apparatus 105b of the user who requests the authenticity confirmation to generate a hash value of the image file.

Figure 10:
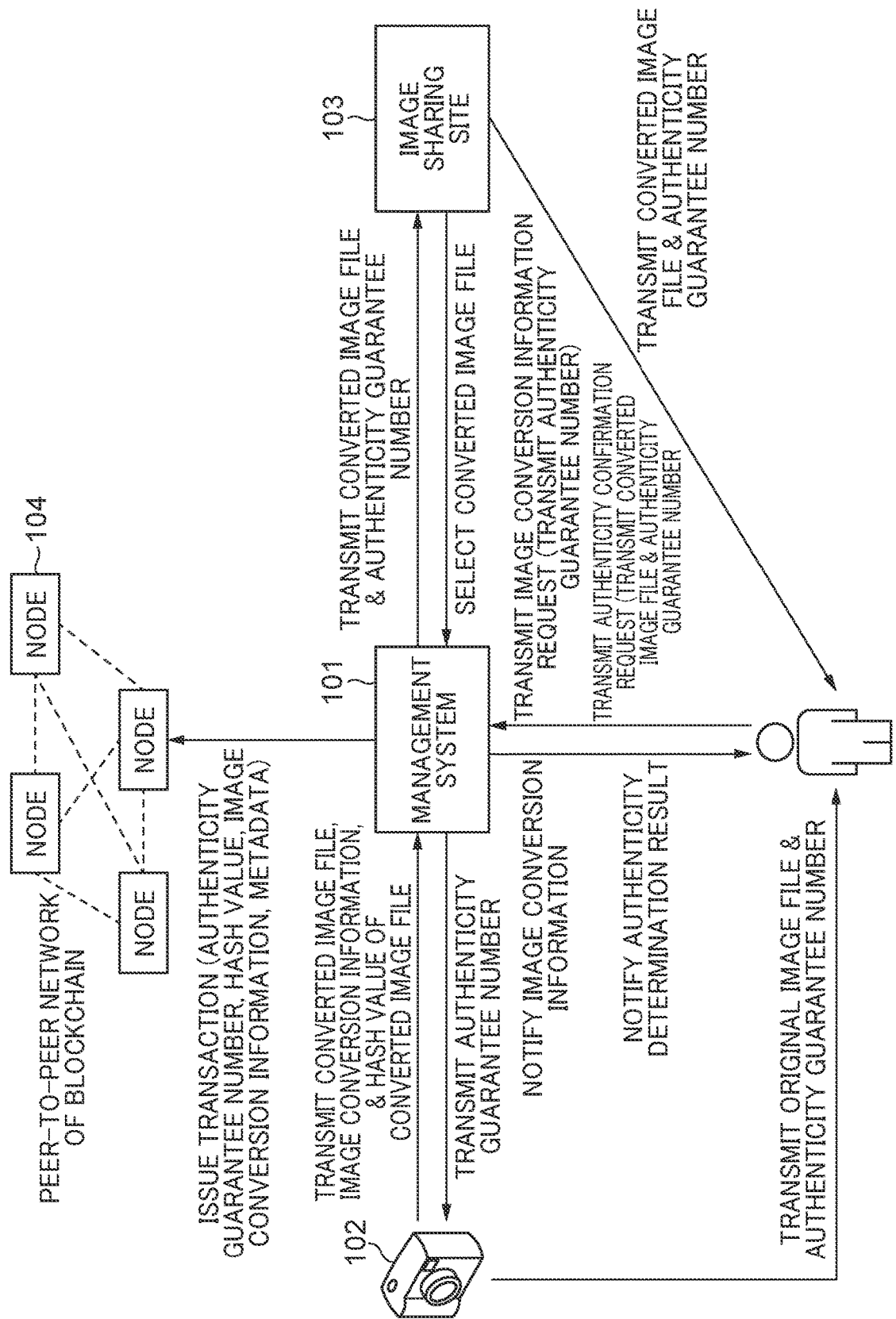
FIG. 10 is a diagram useful in explaining the functions of a management system according to a second embodiment of the present invention.

Next, a description will be given of a second embodiment of the present invention. FIG. 10 is a diagram useful in explaining functions of the management system 101 according to the present embodiment. In the following description, description of the same component elements as those of the first embodiment is omitted.

The management system 101 is equipped with a function of managing contents acquired from an external apparatus, such as the image capturing apparatus 102. The management system 101 is realized by one or more computer apparatuses. For example, when the image capturing apparatus 102 (first generation unit/processing unit) performs operations of photographing and recording an image (image file) which is large in file size, such as an 8K moving image, after the photographing and recording operations are finished, the image capturing apparatus 102 converts the image to an image which is small in file size, such as an FHD moving image. After that, the image capturing apparatus 102 (calculation unit/second generation unit) applies the hash function to the converted image to thereby generate a hash value and generates image conversion information of the image. Then, as shown in FIG. 10, the image capturing apparatus 102 (transmission unit) transmits the converted image file (including image data and metadata), the image conversion information, and the hash value (image hash value) generated from the converted image file to the management system 101.

The image data is still image data or moving image data. The metadata includes attribute information of the image data, indicating a photographer of the image data, a photographing time, a photographing place, a model of the image capturing apparatus, settings of the image capturing apparatus at the photographing time, and so forth. The image conversion information is reduction processing information indicating how an image has been converted (method of reducing a file size). For example, the image conversion information includes image quality information before and after conversion from the 8K moving image to the FHD moving image, and information on a conversion method, such as file format information before and after conversion, indicating, for example, that the image has been converted by developing a still image of the RAW format into a still image of the JPEG format. Note that these information items are an example of the image conversion information, and the image conversion information is not particularly limited insofar as the image conversion is performed such that the file size is reduced. For example, the image conversion may be down-conversion processing for reducing image quality, a frame rate, or a bit rate, processing for reducing the file size by developing a RAW image into a JPEG image, or a method of deleting part of metadata of an image file. Further, a plurality of types of conversion processing may be performed. The image conversion information may include a plurality of information items indicating how the image has been converted, or related information, such as a PC environment necessary for conversion. Further, the hash value of the present embodiment is a value obtained by applying the hash function to the converted image file.

Note that although in the present embodiment, a description will be given of a configuration in which the image capturing apparatus 102 generates a hash value and transmits the generated hash value to the management system 101, this is not limitative. For example, the management system 101 may generate a hash value based on the converted image file acquired from the image capturing apparatus 102.

The management system 101 (first reception unit) of the present embodiment receives the converted image file, the image conversion information, and the hash value generated from the converted image file, from the image capturing apparatus 102. Next, the management system 101 (identification number generation unit) generates an authenticity guarantee number which is a unique number in the management system 101. The authenticity guarantee number is an identification number for uniquely identifying the received image file.

The management system 101 (registration unit) generates transaction data including the metadata, the hash value, and the authenticity guarantee number, writes the generated transaction data into a block, and connects (registers) this block to (in) the blockchain. Specifically, first, the management system 101 issues the generated transaction data and broadcasts the transaction data to one or more computers (nodes) participating in the peer-to-peer network 104 of the blockchain. With this, the transaction data is temporarily stored in a transaction pool, and when the transaction data is approved by miners, verification is completed. Then, a block in which the transaction data has been written is generated and added to the end of the blockchain.

Further, the management system 101 (management unit) stores the converted image file, the image conversion information, and the authenticity guarantee number in the image database 407 appearing in FIG. 4, in a state associated with each other and manages them. Then, the management system 101 transmits the authenticity guarantee number to the image capturing apparatus 102.

Further, the image capturing apparatus 102 transmits the original image file before conversion and the authenticity guarantee number received from the management system 101 to the user. At this time, although the notification method is not particularly limited, as the original image file before conversion, high-quality image data having a large file size is assumed, and hence there is a high possibility that the image data is handed by using a local hard disk.

After that, the user requests the management system 101 to acquire the image conversion information, using the authenticity guarantee number. The management system 101 displays the image conversion information on the Web page displayed by the management system 101 or notifies the user of the image conversion information by email. Alternatively, a method is considered in which the information is notified to image conversion software used by the user. The user converts the original image file using the notified image conversion information and then transmits an authenticity confirmation request to the management system 101. To make the authenticity confirmation request, it is only required that the management system 101 can receive the converted image file and the authenticity guarantee number (operation of a second reception unit). For example, the authenticity confirmation request is performed by a user input of the converted image file and the authenticity guarantee number to an entry form provided by the management system 101 or by transmission of an email to which the converted image file and the authenticity guarantee number are attached, to the management system 101.

The management system 101 displays a result of the authenticity determination on the Web page displayed by the management system 101 or notifies the user by email. With this, it is possible to perform the authenticity determination without transmitting the image file which is large in file size to the management system 101.

Further, a case is considered where the converted image file is disclosed e.g. to the SNS and is used. The management system 101 is equipped with a function of providing the converted image file stored in the image database 407 to the image sharing site 103. For example, the management system 101 causes a user (e.g. a photographer or an image provider) to select a converted image file to be disclosed on the image sharing site 103 from a plurality of converted image files stored in the image database 407. The user can select a converted image file to be disclosed on the image sharing site 103, from the WEB page of the management system 101, which is displayed by a communication apparatus (not shown) operated by this user.

The management system 101 provides the image file selected by the user and the authenticity guarantee number associated with this image file to the communication apparatus of the user and the image sharing site 103. The image sharing site 103 controls the display on the WEB page thereof such that the authenticity guarantee number provided from the management system 101 together with the image file is displayed e.g. in the vicinity of the image file. Note that the authenticity guarantee number is displayed in the above-mentioned position by way of example, and is only required to be displayed in a position where a viewing user of the image sharing site 103 can recognize that it is the authenticity guarantee number associated with the image file.

There is a case where a viewing user of the image sharing site 103 desires to confirm that an image file displayed on the WEB page of the image sharing site 103 has not been altered. In this case, first, the viewing user acquires (downloads) the image data and the authenticity guarantee number associated with this image data from the image sharing site 103 using the communication apparatus 105*b*. Next, the viewing user transmits a request for confirming the authenticity of this image file from the communication apparatus 105 to the management system 101 together with the acquired image file and the authenticity guarantee number. The management system 101 performs the authenticity determination on the provided image file. This makes it possible to confirm the authenticity even in a case where the converted image file is disclosed.

Figure 11:
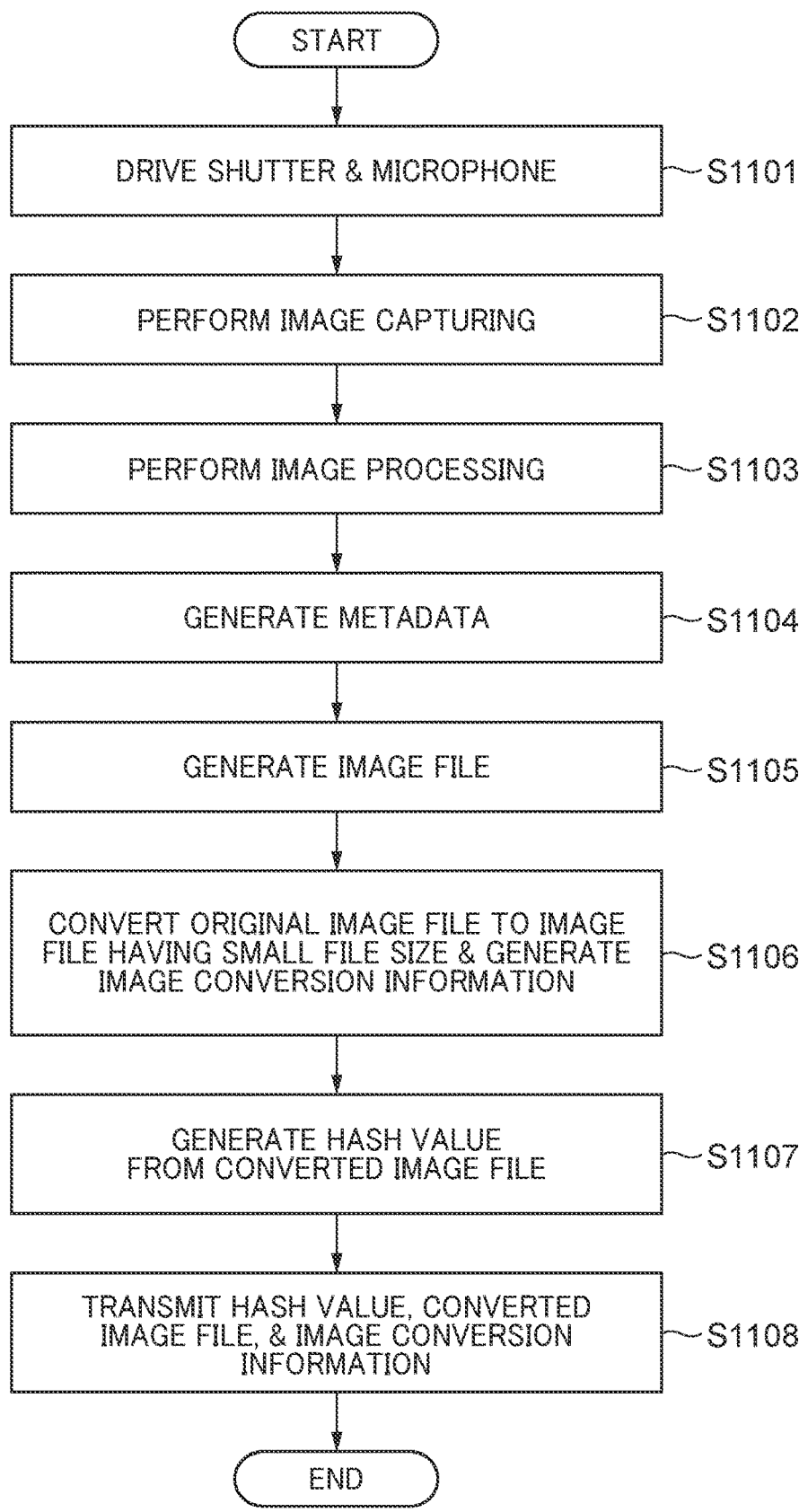
FIG. 11 is a flowchart of a data transmission process performed by the image capturing apparatus appearing in FIG. 10.

FIG. 11 is a flowchart of a data transmission process performed by the image capturing apparatus 102 appearing in FIG. 10. The data transmission process in FIG. 11 is realized by the MPU 201 of the image capturing apparatus 102, which executes a program stored e.g. in the recording medium 209. The data transmission process in FIG. 11 is executed e.g. when the image capturing apparatus 102 receives a photographing start operation performed by a photographer, such as an operation of pressing the photographing button of the image capturing apparatus 102 or when photographing is terminated and a file is generated and stored in the recording medium 209.

Referring to FIG. 11, the MPU 201 drives a microphone to record voice and the shutter to control exposure time (step S1101). Then, the MPU 201 performs image capture processing for converting light from an object, received by the image sensor 203, to electrical signals (step S1102). Then, the MPU 201 performs image processing, such as development and encoding, on the data obtained by the above-described image capture processing (step S1103). As a result, image data is generated. Then, the MPU 201 generates metadata including attribute information (a photographer, a photographing time, a photographing place, a model of the image capturing apparatus, settings of the image capturing apparatus at the photographing time, and so forth) of image data when the image capture processing for generating the image data has been performed (step S1104).

Then, the MPU 201 generates an image file in the MP4 format, the CRM format, or the like, which is formed by adding the generated metadata to the image data, and records the generated image file in the recording medium 209 (step S1105). Then, the MPU 201 converts the original image file to an image file which is small in file size and generates the image conversion information (step S1106). Note that the original image assumed at this time is a high-quality image of 4K or 8K, a moving image or still image in the RAW format, or the like, which is large in file size, and the converted moving image or still image is assumed to be a moving image of FHD image quality, a still image in the JPEG format, or the like, which is small in file size. Further, the file conversion method is not particularly limited insofar as it can reduce the file size. For example, not only down-conversion processing for reducing image quality, a frame rate, or a bit rate, but also processing for reducing the file size by developing a RAW image into a JPEG image, processing for thinning image data itself, or processing for deleting metadata of an image file may be employed. Further, the image conversion information may include related information necessary for conversion (such as a thinning method and the like).

Then, the MPU 201 generates a hash value by applying a hash function to the binary data of the converted image file (step S1107).

Then, the MPU 201 transmits the hash value generated from the converted image file, the image conversion information, and the converted image file to the management system 101 (step S1108), followed by terminating the present process. Note that the data transmitted in the step S1108 may be encoded.

Thus, in the present embodiment, when the image capturing apparatus 102 performs the photographing operation, not only the image file including the image data and the metadata is recorded in the recording medium 209, but also the converted image file and the hash value are transmitted to the management system 101.

In the blockchain registration process in the present embodiment, the controller 400 receives the image conversion information in place of the hash value calculation detailed information in the step S601. Then, in the step S602, the controller 400 (third acquisition unit) applies conversion processing based on the image conversion information to the image file received in the step S601, and calculates a hash value (third hash value) by applying the hash function to the converted image file.

Further, in the present embodiment, the image conversion information is stored in the transaction 704 in place of the hash value calculation detailed information of the first embodiment, appearing in FIG. 7.

Further, in the authenticity determination process in the present embodiment, in the step S904, the controller 400 acquires the image conversion information in place of the hash value calculation detailed information of the first embodiment. Then, a hash value is generated by executing the conversion processing on the image file by referring to this image conversion information and applying the hash function to the converted image file (operations of the first acquisition unit/second acquisition unit/authenticity determination unit).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-170402, filed Oct. 18, 2021, and Japanese Patent Application No. 2022-137220, filed Aug. 30, 2022, which are hereby incorporated by reference herein in their entirety.

What is claimed is:

1. An image capturing apparatus comprising:
at least one processor; and
a memory coupled to the at least one processor, the memory having instructions that, when executed by the at least one processor, perform operations as:
a first generation unit configured to generate an image file;
a processing unit configured to perform conversion processing on the image file for reducing a file size of the image file;
a calculation unit configured to calculate a hash value by applying a hash function to the processed image file;
a second generation unit configured to generate reduction processing information indicating a method of reducing the file size of the image file; and
a transmission unit configured to transmit the image file, the hash value, and the reduction processing information, in a state associated with each other, to a management system that registers data concerning the image file including the hash value in a blockchain,
wherein the reduction processing information includes information on the image file before the conversion processing and information on the image file after the conversion processing,
wherein the information on the image file before the conversion processing and the information on the image file after the conversion processing include image file format information that indicates file type.

2. A management system comprising:
at least one processor; and
a memory coupled to the at least one processor, the memory having instructions that, when executed by the at least one processor, perform operations as:
a first reception unit configured to receive, from an image capturing apparatus, an image file, a hash value of the image file, and reduction processing information which includes information on the image file before performing processing for reducing a file size of the image file by the image capturing apparatus and information on the image file after performing processing for reducing a file size of the image file by the image capturing apparatus;
an identification number generation unit configured to generate an identification number for identifying the image file;
a management unit configured to manage the hash value, the reduction processing information, and the identification number, in a state associated with each other;
a registration unit configured to register the hash value in a block of a blockchain;
a second reception unit configured to receive, from a first communication apparatus, a target image file as a target of authenticity determination and a target identification number of the target image file;
a first acquisition unit configured to acquire a first hash value generated by performing processing for reducing a file size of the target image file received from the first communication apparatus, by referring to the reduction processing information associated with the target identification number, and applying a hash function to the processed target image file;
a second acquisition unit configured to acquire a second hash value from a block of the blockchain, which is associated with the target identification number received from the first communication apparatus and managed by the management unit; and
an authenticity determination unit configured to determine authenticity of the target image file by comparing the first and the second hash values,
wherein the information on the image file before performing processing for reducing a file size of the image file by the image capturing apparatus and the information on the image file after performing processing for reducing a file size of the image file by the image capturing apparatus include image file format information that indicates file type.

3. The management system according to claim 2, wherein the image file includes still image data or moving image data.

4. The management system according to claim 2, further comprising an image database in which an ID number of a block storing the hash value, which is managed by the management unit, the image file, and the identification number are registered in a state associated with one another, and
wherein according to a request received from a user, for transmitting the image file to a sharing site, the image file and the identification number are acquired from the image database and transmitted to the sharing site.

5. The management system according to claim 2, wherein the memory having instructions that, when executed by the at least one processor, perform operations further as:
a third acquisition unit configured to acquire a third hash value generated by performing processing for reducing a file size of the image file received by the first reception unit by referring to the reduction processing information received by the first reception unit and applying a hash function to the processed image file, and wherein in a case where the hash value received by the first reception unit and the third hash value match, the registration unit registers the received hash value in a block of the blockchain.

6. A method of controlling an image capturing apparatus, comprising:

generating an image file;

performing conversion processing on the image file for reducing a file size of the image file;

calculating a hash value by applying a hash function to the processed image file;

generating reduction processing information indicating a method of reducing the file size of the image file; and transmitting the image file, the hash value, and the reduction processing information, in a state associated with each other, to a management system that registers data concerning the image file including the hash value in a blockchain, wherein the reduction processing information includes information on the image file before the conversion processing and information on the image file after the conversion processing, and wherein the information on the image file before the conversion processing and the information on the image file after the conversion processing include image file format information that indicates file type.

7. A method of controlling a management system, comprising:

receiving, from an image capturing apparatus, an image file, a hash value of the image file, and reduction processing information which includes information on the image file before performing processing for reducing a file size of the image file by the image capturing apparatus and information on the image file after performing processing for reducing a file size of the image file by the image capturing apparatus;

generating an identification number for identifying the image file;

managing the hash value, the reduction processing information, and the identification number, in a state associated with each other;

registering the hash value in a block of a blockchain;

receiving, from a first communication apparatus, a target image file as a target of authenticity determination and a target identification number of the target image file;

acquiring a first hash value generated by performing processing for reducing a file size of the target image file received from the first communication apparatus, by referring to the reduction processing information associated with the target identification number, and applying a hash function to the processed target image file;

acquiring a second hash value from a block of the blockchain, which is associated with the target identification number received from the first communication apparatus and managed by said managing; and determining authenticity of the target image file by comparing the first and the second hash values, wherein the information on the image file before performing processing for reducing a file size of the image file by the image capturing apparatus and the information on the image file after performing processing for reducing a file size of the image file by the image capturing apparatus include image file format information that indicates file type.

8. A non-transitory computer-readable storage medium storing a program for causing a computer to execute a method of controlling an image capturing apparatus, wherein the method comprises:

generating an image file;

performing conversion processing on the image file for reducing a file size of the image file;

calculating a hash value by applying a hash function to the processed image file;

generating reduction processing information indicating a method of reducing the file size of the image file; and transmitting the image file, the hash value, and the reduction processing information, in a state associated with each other, to a management system that registers data concerning the image file including the hash value in a blockchain, wherein the reduction processing information includes information on the image file before the conversion processing and information on the image file after the conversion processing, and wherein the information on the image file before the conversion processing and the information on the image file after the conversion processing include image file format information that indicates file type.

9. A non-transitory computer-readable storage medium storing a program for causing a computer to execute a method of controlling a management system, wherein the method comprises:

receiving, from an image capturing apparatus, an image file, a hash value of the image file, and reduction processing information which includes information on the image file before performing processing for reducing a file size of the image file by the image capturing apparatus and information on the image file after performing processing for reducing a file size of the image file by the image capturing apparatus;

generating an identification number for identifying the image file;

managing the hash value, the reduction processing information, and the identification number, in a state associated with each other;

registering the hash value in a block of a blockchain;

receiving, from a first communication apparatus, a target image file as a target of authenticity determination and a target identification number of the target image file;

acquiring a first hash value generated by performing processing for reducing a file size of the target image file received from the first communication apparatus, by referring to the reduction processing information associated with the target identification number, and applying a hash function to the processed target image file;

acquiring a second hash value from a block of the blockchain, which is associated with the target identification number received from the first communication apparatus and managed by said managing; and determining authenticity of the target image file by comparing the first and the second hash values, wherein the information on the image file before performing processing for reducing a file size of the image file by the image capturing apparatus and the information on the image file after performing processing for reducing a file size of the image file by the image capturing apparatus include image file format information that indicates file type.

\* \* \* \* \*